US008131573B1

(12) United States Patent
Dibble et al.

(10) Patent No.: US 8,131,573 B1
(45) Date of Patent: Mar. 6, 2012

(54) METHOD TO FACILITATE THE TRANSPORT OF SHIPMENTS VIA HUB BASED FACILITIES

(75) Inventors: Robert W. Dibble, Flower Mound, TX (US); Spencer K. Dickinson, Grapevine, TX (US); Thomas W. Harwood, Irving, TX (US); Donald T. Larney, Keller, TX (US)

(73) Assignee: American Airlines, Inc., Fort Worth, TX (US)

( * ) Notice: Subject to any disclaimer, the term of this patent is extended or adjusted under 35 U.S.C. 154(b) by 3424 days.

(21) Appl. No.: 10/384,883

(22) Filed: Mar. 10, 2003

(51) Int. Cl.
G06Q 10/00 (2012.01)
G06Q 50/00 (2012.01)
G07B 15/02 (2011.01)

(52) U.S. Cl. .................................. 705/5; 705/6; 235/384
(58) Field of Classification Search .......................... None
See application file for complete search history.

(56) References Cited

U.S. PATENT DOCUMENTS

| 4,058,217 | A |   | 11/1977 | Vaughan et al. ............ 209/74 M |
| 5,847,374 | A | * | 12/1998 | Menconi ....................... 235/492 |
| 5,920,053 | A | * | 7/1999 | DeBrouse ..................... 235/375 |
| 6,018,739 | A | * | 1/2000 | McCoy et al. ...................... 1/1 |
| 6,023,679 | A | * | 2/2000 | Acebo et al. ...................... 705/5 |
| 6,222,452 | B1 | * | 4/2001 | Ahlstrom et al. ........... 340/572.1 |
| 6,437,272 | B2 |   | 8/2002 | Tamamoto et al. ........... 209/584 |
| 6,476,718 | B1 | * | 11/2002 | Cartwright et al. ......... 340/572.1 |
| 6,910,628 | B1 | * | 6/2005 | Sehr .............................. 235/384 |
| 7,617,136 | B1 | * | 11/2009 | Lessing et al. ................. 705/28 |
| 7,783,557 | B2 | * | 8/2010 | Laurent et al. .................. 705/37 |
| 2002/0014955 | A1 | * | 2/2002 | Klitsgaard .................. 340/10.42 |
| 2002/0019759 | A1 |   | 2/2002 | Arunapuram et al. ............ 705/7 |
| 2002/0032573 | A1 |   | 3/2002 | Williams et al. .................. 705/1 |
| 2002/0099567 | A1 |   | 7/2002 | Joao .................................. 705/1 |
| 2002/0181710 | A1 | * | 12/2002 | Adam et al. .................. 380/270 |
| 2003/0189094 | A1 | * | 10/2003 | Trabitz .......................... 235/385 |
| 2004/0015409 | A1 | * | 1/2004 | Chittenden et al. ............. 705/26 |
| 2004/0222898 | A1 | * | 11/2004 | Gabig et al. ............. 340/825.49 |
| 2006/0145852 | A1 | * | 7/2006 | McElhannon et al. ..... 340/572.1 |

* cited by examiner

*Primary Examiner* — Mussa A Shaawat
(74) *Attorney, Agent, or Firm* — Winstead PC (57) ABSTRACT

A method to facilitate the transport of shipments via hub based facilities according to a scheduled and uniquely identifiable transport accommodation by (a) acknowledging a customer request to transport at least one shipment between two uniquely identifiable and geographically disparate origination and destination locations; (b) determining a routing sequence and at least one scheduled and uniquely identifiable transport accommodation satisfying the customer's request; (c) booking transport space for the shipment aboard the determined transport accommodation; (d) printing or otherwise displaying a shipment tag which denotes shipment routing information and bar coded information recognized by two distinguishably purposed and automated tracking systems; (e) attaching or otherwise affixing the shipment tag generated in step (d) to a shipment to be transported according to the routing sequence and transport accommodation determined in step (b); (f) stowing the shipment of step (e) aboard a first transport accommodation consistent with shipment routing information generated in step (d); (g) monitoring and recording the transport of the shipment stowed in step (f) as it is transported between uniquely identifiable and geographically disparate origination and destination locations; and (h) advising a customer of the shipments arrival in a final destination location.

15 Claims, 4 Drawing Sheets

METHOD TO FACILITATE THE TRANSPORT OF SHIPMENTS VIA HUB BASED FACILITIES

REFERENCE TO PENDING APPLICATIONS

This application is not related to any other pending application.

REFERENCE TO MICROFICHE APPENDIX

This application is not referenced in any microfiche appendix.

BACKGROUND OF THE INVENTION

Cargo handling processes, particularly air cargo processes, are well known in the art. Automated passenger service baggage tracking systems are also well known in the art. What is not known in the art is an integrated methodology for facilitating the routing, transport and statusing of such shipments according to scheduled and uniquely identifiable transport accommodations with tracking of shipment status accommodated via two distinguishably purposed automated systems according to Cargo Routing Guide (referred synonymously herein as "CRG") standards and protocol.

As used herein, the term "shipment" is used synonymously and with "freight"; "cargo"; "freightage"; "goods"; "lading"; "payload" and other similarly intended nouns and is further intended to include one or more items comprising a "shipment", each item capable of varying size and weight dimensions.

Practice of the instant invention provides for faster transit time, particularly for U.S. domestic shipment(s) by utilizing a tail-to-tail transfer methodology identified and tracked by automated passenger baggage and freight tracking systems. The invention provides for a novel and efficient method, which eliminate the additional time and effort required to transport shipments to a centralized handling facility, sort transfer shipments and re-tender the shipments to the ramp for aircraft loading. The invention's novel multi-system tracking tag, combines the components of both freight shipments and baggage to facilitate the tail-to-tail process, resulting in a process which can be performed multiple times at various transfer points throughout the entire day, seven days a week.

Various devices and methods for providing shipment information and sorting shipped articles are represented prior art. For purposes of ready convenience, the following prior art references are briefly summarized below with ready distinction easily ascertainable by those skilled in the art with respect to each prior art teaching versus benefits, intent, disclosure and claims offered by the instant invention.

U.S. Pat. No. 4,058,217 issued to Vaughn discloses an automated article sorting system wherein an electronically interrogatable label is provided for and attached to each article, the label bearing indicia indicative of a serial number, instructions relating to the routing of the label bearing those indicia being fed into a suitable computing system arranged to control the operation of sorting devices on receipt of a signal from a reader arranged to interrogate the label. The term "label" is intended to include any device such as, for example, a tag, capable of carrying the necessary indicia and of being attached to an article to be sorted. As U.S. Pat. No. 4,058,217 is directed towards disclosure and claims which relate to an electronically interrogatable label for purposes of subsequent computerized sorting, its teachings and claims appear discernibly deficient with respect the process steps and unique tracking tag of the instant invention which may or may not be used in conjunction with automated or manual processes.

U.S. Pat. No. 6,437,272 issued to Tomamoto discloses an article delivery system. In an article delivery system, articles each having sorting information are handled, and the articles are arranged in proper delivery order through a plurality of arrangement paths so as to help the delivery of the articles. This system includes a sorting information procuring device for procuring the sorting information of each article, an article information storage device which is connected to the sorting information procuring device, and collects and stores the sorting information, a database for providing the order of arrangement of the sorting information, an information processing device for arranging the sorting information in the order, provided by the database, while including information for distinguishing the arrangement paths from each other, and delivery order forming device having a communication device for transmitting the sorting information arranged by the information processing device. Similar to the discernibly distinguishable comments made in association with U.S. Pat. No. 4,058,217, U.S. Pat. No. 6,437,272 appears limited to disclosure and claims relating to sorting and procuring devices which allow for the arrangement of article delivery order in concert with identifiably information stored, read and processed by a sorting information procuring device.

United States Publication No. 20020019759 issued to Arunapuram discloses a transportation planning, execution and freight payments managers and related methods. This publication discloses a transport manager and related method for determining an optimal, cost-minimizing set of product transportation decisions based upon expected transportation costs. Additionally, disclosed herein is an electronic execution and related method for tracking and controlling the delivery and/or pickup of products according to the optimal transportation plan and a payment manager and related method for forwarding payments and invoices for the transport of the products. United States Publication No. 20020019759 is directed towards and claims a transport manager and related method for determining a low cost minimizing set of product transportation decisions based upon expected transportation costs, electronic execution associated therewith, related tracking controls and a payment manager. As such it appears absent any disclosure, teaching or intent as proposed by the instant invention, particularly those with respect to the requirement of utilizing a multi-purpose tag in concert with one or more automated systems to facilitate tail-to-tail transfers and guaranteed shipment delivery standards of the instant invention.

United States Publication No. 20020099567 issued to Joao discloses an apparatus and method for providing shipment information. An apparatus and method for providing shipment information, including a memory device for storing shipment information, a processor for processing at least one of a request and a prompt to provide shipment information, wherein the processor processes the information contained in the memory device, and further wherein the processor generates a delivery message, wherein the delivery message contains information regarding at least one of a shipment description, contents of a shipment, a description of a shipment's contents, the value of a shipment, an shipment invoice, a shipment packing slip, and a shipment bill, and an output device for at least one of outputting, displaying, and printing, information contained in the delivery message. United States Publication No. 20020099567 discloses an apparatus and method for storing and processing shipment information and is discernibly deficient with respect to the teachings of the novel tracking tag, processing steps and tail-to-tail transfer capabilities as disclosed in association with the instant invention.

United States Publication No. 20020032573 issued to Williams discloses an apparatus, systems and methods for online, multi-parcel, multi-carrier, multi-service enterprise parcel shipping management. This publication provides a plurality of Enterprises with a single online user interface with which the Enterprise can provide Enterprise Shippers, shipping origination users and shipping intermediary users with an automated parcel management system for a plurality of supported Carriers for a plurality of services. Publication No. 20020032573 provides for the hierarchical definition of users, including the establishment of at least one user for each Enterprise as a Super-Administrator with the highest level of privileges and authority for the Enterprise, and the identification of other users as Sub-Administrators, Desktop Users and Shipping Station Users and also provides for the hierarchical definition of organizational units within each Enterprise, including the definition of sites, groups within a site, and users within a group. Publication No. 20020032573 appears to lastly provide for a distinct definition of policies, privileges, and other types of specifications for each user level, each user, and each organizational unit and applies the user and organizational policies, privileges and other specifications as they apply to each particular user to drive the interactive interface with each particular user and to provide among other things, shipping options, shipping services, shipping rates, traveler and/or shipping label preparation, and shipment tracking. Consequently as with the afore cited references, Publication No. 20020032573 appears absent any disclosure, teaching or claim tendered by the instant invention, particularly with regard to the invention's unique processing steps utilized in conjunction with a multi-system transport tag and interaction with automated baggage and freight processing systems.

BRIEF SUMMARY OF THE INVENTION

The present invention is a method for facilitating the transport of shipments according to a scheduled and uniquely identifiable transport accommodation said method comprising the steps of (a) acknowledging a customer request to transport at least one shipment between two uniquely identifiable and geographically disparate origination and destination locations; (b) determining a routing sequence and at least one scheduled and uniquely identifiable transport accommodation satisfying said customer request; (c) booking transport space for the shipment aboard said determined transport accommodation; (d) printing or otherwise displaying a shipment tag which denotes shipment routing information and bar coded information identifiable to two distinguishably purposed shipment tracking systems; (e) attaching or otherwise affixing the shipment tag generated in step (d) to a shipment transported according to the routing sequence and transport accommodation determined in step (b); (f) stowing the shipment of step (e) aboard a first transport accommodation consistent with shipment routing information generated in step (d); (g) monitoring and recording the transport of the shipment stowed in step (f) as it is transported between uniquely identifiable and geographically disparate origination and destination locations; and (h) advising a customer of a shipments arrival in a final destination location.

Patently distinguishable from the limited capability cargo handling systems of the contemporary art is the invention's ability to track shipments by both an air cargo/air waybill identification scheme as well as a passenger baggage identification code preprinted or otherwise displayed upon a unique dual system identification tag. Such presentation of dual system information allows shipment handling personnel to route the shipment between connecting transport accommodations directly, without forwarding the shipment to a centralized handling facility as required in contemporary art systems. With particular reference to the airline industry, such direct transport accommodation transfers are typically known as "tail-to-tail transfers". Consequently, the unique process steps and baggage tag combination of the instant invention allows shipments to be treated, transferred and tracked as baggage items as well as a freight shipment to facilitate handling in a manner far more timely than that provided by any contemporary system.

It is therefore an object of the instant invention to provide a system which allows for confirmed space aboard one or more transport accommodations when transporting a customer shipment between origination and destination cities.

It is another object of the instant invention to provide an enhanced efficiency system provides allowing guaranteed delivery of a customer's shipment within a variably defined standard.

Yet another object of the instant invention is to allow for optimization of cargo revenue aboard a transport accommodation.

A further object of the instant invention is to disclose a method for facilitating the transport of shipments via hub based facilities utilizing a plurality of transport accommodations.

It is yet another object of the instant invention to disclose a method by which transported shipments may be simultaneously tracked by at least two independent automated systems.

Yet another object of the instant invention is to allow shipments to be identified and located by either air waybill number or baggage claim identifier.

A further object of the instant invention is to disclose and claim a method by which a shipment may be transported through a hub based facility having given consideration to shipment dimension, weight, quantity type and transport accommodation variability.

Another object of the instant invention is to generate and provide a sophisticated shipment tag supporting various forms of transport accommodations.

An additional object of the invention is to provide a method wherein passenger load and cargo requirements may be factored whenever an aircraft is used to effectuate shipment transport.

A further object of the instant invention is to disclose and claim a method by which tail-to-tail transfers may be facilitated to avoid the necessity of centralized handling facility processing.

Another object of the instant invention is to generate and provide a dual system shipment tracking tag that may be scanned by both passenger baggage and air freight/cargo scanners.

Yet another object of the instant invention is to disclose and claim methodology which may be employed across and utilized by the combination of transport accommodations.

An object of the invention is to provide a back up capability where the shipment may be identified by either a cargo tracking system and a passenger baggage service system.

Another object of the instant invention is to teach a method by which a predominantly passenger focused airline may utilize a combination of cargo and baggage tracking systems to improve it's cargo handling/transfer protocol through major transit hubs.

A further object of the instant invention is to teach a method of cargo transport independent of hub, time or transport accommodation dependencies.

Additional objects and advantages of the invention are set forth, in part, in the description which follows and, in part, will be apparent to one of ordinary skill in the art from the description and/or from the practice of the invention. These together with other objects of the invention, along with the various features of novelty which characterize the invention, are pointed out with particularity in the claims annexed to and forming a part of this disclosure.

For a better understanding of the invention, its operating advantages and the specific objects realized by its uses, reference would be had to the accompanying drawings, depictions and descriptive matter in which there is illustrated preferred embodiments and results of the invention.

DETAILED DESCRIPTION OF THE PREFERRED EMBODIMENT

While the making and using of various embodiments of the present invention are discussed in detail below, it should be appreciated that the present invention provides for inventive concepts capable of being embodied in a variety of specific contexts. The specific embodiments discussed herein are merely illustrative of specific manners in which to make and use the invention and are not to be interpreted as limiting the scope of the instant invention.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is clear that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

For purposes of full and enabling disclosure and to assist in invention comprehension, process steps of the instant invention will be discussed and disclosed in association with aircraft type transport accommodations. However, as will be readily appreciated by those skilled in the art, the process steps of the instant invention are not limited to aircraft/airline application exclusively or the process step sequencing as illustrated in FIG. 1.

Figure 1:
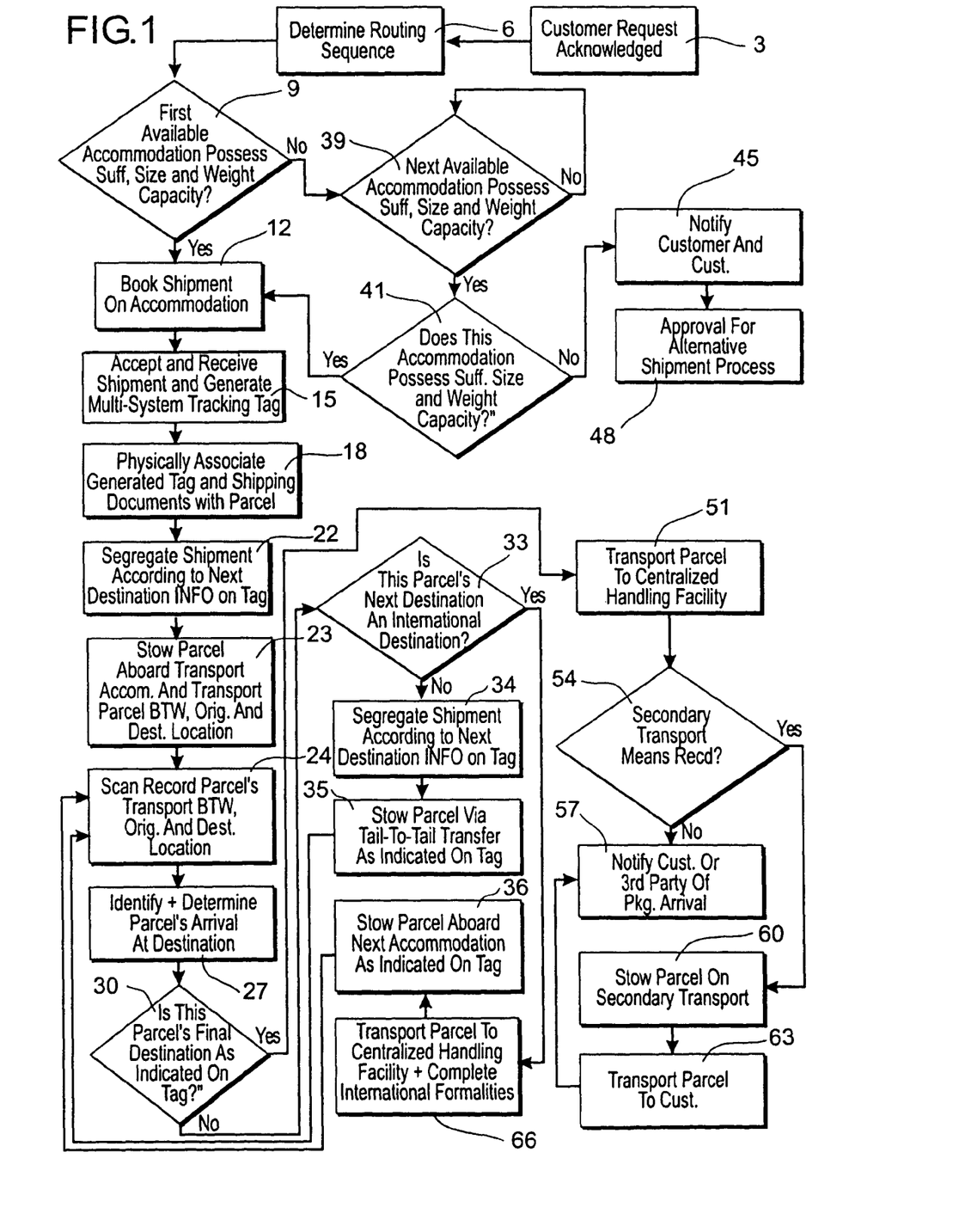
FIG. 1 is a flowchart which illustrates a non-limiting step sequence in one embodiment of the instant invention.

FIG. 1 is a flowchart which illustrates a non-limiting step sequence in one embodiment of the instant invention. Turning now to FIG. 1.

In FIG. 1 a customer request to transport a shipment between origination and destination cities is first acknowledged 3. Acknowledgment of a customer shipping request is typically though not limitedly in response to a customer calling into a shipment processing center or electronically booking a shipment between origination and destination cities or indeed, in response to a customer physically bringing all or a portion of a shipment to a centralized shipment processing facility. Acknowledgment of the customer request is further evidenced in most instances via a manual or automated generation of a bill of lading, air waybill or other similarly intended documentation identifying and characterizing the shipment as well as relevant information relating to the shipment, such as weight, size, number of pieces, time of rendering, etc. The instant invention once having acknowledged the customer request next determines a first available routing sequence to facilitate transport of the shipment from an origination city to a destination city 6. The routing is determined in one embodiment of the instant invention via an automated processing means whereby routing sequences can be identified as uniquely scheduled and identifiable transport accommodation(s) satisfying the customer's request for shipment transport. Such automated means of identifying uniquely identifiable transport accommodation and routing sequences are known to those skilled in the art. Examples of such systems would include Lufthansa Airlines' cargo tracking system for the "td. Flash" product; United Airlines system td. Guaranteed; Federal Express and UPS systems as well as the American Airlines Cargo system. (Distinction between the American Airlines cargo system and examples of FEDEX, UPS, United and Lufthansa noted as the American Airlines cargo system addresses the additional complexity of passenger and passenger bag volume fluxuations as well as multiple aircraft and shipment commodity types). A routing sequence is typically determined via a "table lookup" methodology well known to those skilled in the programming arts. Essentially a table lookup merely requires determining origination and destination points for shipments transport and then searching a database to determine a first available transport accommodation satisfying the shipments transport requirements within a pre-defined scheduled time frame. It is to be noted however that the resiliency and flexibility of the instant invention would and can be applied to any lookup means including a manual lookup means whereby determination can be made of one or more transport accommodations satisfying shipment requirements between origination and destination cities. Having determined a first available routing sequence, the instant invention next determines if the first available accommodation in the determined routing sequence possesses sufficient size and weight capacity to accommodate the customer's shipment 9. Should the first available routing sequence be unable to accommodate shipment due to size and weight limitations, the invention then determines a next available routing accommodation and determines if it possesses sufficient size and weight capacity to transport the customer's shipment 39. Should the next available accommodation prove unable to provide adequate transport capacity 39, subsequent accommodations are checked for capacity thresholds, until such time an available accommodation meets pre-established delivery standards for the shipment's arrival at a destination city. Should a transport accommodation be unable to facilitate transport of the customer's shipment within allowable standards, the customer is notified 45 and approval sought for an alternative shipment process 48. Such alternative shipment processes 48 may include a transport accommodation of the same type as originally requested or an alternative transport accommodation.

Once a transport accommodation and a preferred routing sequence has been determined to possess adequate capacity to accommodate the customer's shipment within previously specified and guaranteed delivery standards, the shipment is then booked on the transport accommodation 12. Cargo shipments are made according to a distinct set of CRG rules that govern bookings prior to allocating shipment space on the accommodation. Examples of dynamically modifiable rules that govern bookings in accordance with the instant invention's use of passenger aircraft transport accommodations include but are not limited to the following:

Domestic cutoff time of 120 minutes prior to scheduled departure time based on the time the shipment is log received. (90 minutes for Customer loaded container shipments (CLC's)

International cutoff time of 240 minutes prior to scheduled departure time based on the time the shipment is received (180 minutes for Customer loaded container shipments (CLC's) limit weight per (shipment) piece per shipment (actual weight typically 100 pounds bulk)

piece dimension limit is in accordance with maximum bag system limit (or aircraft type limitation)

weight limit per flight to be established by booking buckets     limit origin and destination     dangerous goods will not be accepted (rate type limiter) except for any dry ice up to 5 pounds per piece     passenger connection limits for domestic     240 minutes connection for international     split bookings are not accepted (except CLC's)

must book connections to a subsequent flight within variable standard     Human Remains are not accepted     High Value Item restrictions The instant invention has been extensively tested and practiced with respect to accommodation bookings utilizing the American Airlines cargo system which is executed under the dispatching control of American's flight operating system (hereinafter referred to synonymously and interchangeably with the term "FOS"). It will be readily apparent to those skilled in the art however any freight/cargo processing software capable of interpreting CRG rules and making bookings in concert therewith may be adapted to facilitate the invention's processing step requirements as would be manual booking exercise. For purposes of illustration and non-limiting example, the immediately following Booking Table I. is provided to illustrate detailed interaction and freight/cargo system response when practicing the instant invention in concert with the American Airlines FOS system.

Booking Entry Table I

In order to create a booking an "advance" air waybill is required. Certain elements of an actual air waybill are required to create an "advance" air waybill. Within the air waybill, the Cargo Routing Guide (CRG) is accessed to obtain a booking. The following outlines the requirements for creating an "advance" air waybill and obtaining a booking via the present invention and CRG Field A - Origin city, air waybill serial number, date and service level.

TABLE ENTRY 1

| | | |
|---|---|---|
| AV/CTYAWB#/DTE///SVC | AV = | Advance Air Waybill |
| e.g. | AWB # = | Air Waybill Serial Number |
| AV/DFW/13///EPX (enter) | CTY = | Origin City |
| | DTE = | Date |
| | SVC = | Service Level |

Booking Entry Table I (continued)

TABLE ENTRY 2

Field 1 - Destination City

| | | |
|---|---|---|
| 1/DEST | DEST = | Destination City |
| e.g. | | |
| 1/BDL (enter) | BDL = | Hartford, CT |

TABLE ENTRY 3

Field 4 - Shipper name and city
41/ABC Company
43/Dallas TX

TABLE ENTRY 4

Field 7 - Pieces, weight, description of goods and rate type

| | | |
|---|---|---|
| 7/PCS - WGT L or K/DESC//RTE | PCS = | # of pieces in the shipment |
| e.g. | | |
| 7/10 - 1000L/AUTO PARTS//GCE | WGT = | Weight of shipment |
| (enter) | L = | Pounds |
| | K = | Kilos |
| | DESC = | Description of the goods |
| | RTE = | Rate Type |

TABLE ENTRY 5

Field D - Dimensions of the pieces within the shipment

| | | |
|---|---|---|
| D/I or C LXWXH-PCS | I = | Inches |
| e.g. | C = | Centimeters |
| D/I14X20X22-10 (enter) | L = | Length |
| | W = | Width |
| | H = | Height |
| | PCS = | # of pieces with these dimensions |

TABLE ENTRY 6

Field G - Shipment tender time

| | | |
|---|---|---|
| GRT/TIME | TIME = | Time based on 24 hour clock |
| e.g. | | |
| GRT/2100 (enter) | 2100 = | 9:00 PM local time |

Cargo Routing Guide Entries (made via American Airlines FOS System)
To allow CRG to select booked flight(s):

| | |
|---|---|
| PR/ (enter) | CRG will select best route based on shipment characteristics and available flights (times and capacity) |

TABLE ENTRY 7

To request specific flight itinerary:

| | | |
|---|---|---|
| PR/SADDMMMTIME/FSFLT# | SA = | Shipment Available |
| or | DD = | Day (Date) |
| /FSFLT#-FLT# (multiple flights up to four) | MMM = | Month |
| | TIME = | Time of Tender |
| e.g. | FS = | Flight Specific |
| PR/SA13FEB2100/FS2820-2864 | FLT# = | Flight Number |

If routing is accepted, CRG will as respond as shown, adding the booked flights to the "advance" air waybill record:
ROUTING FROM CRG -
    ADVANCE AIRBILL
RU/BDLAA
T1/AA2820/14DFWSTL CONFIRMED
T2/AA2864/14STLBDL CONFIRMED
BOOKING COMPLETE-    1000L/356CF/2.8POS
EXPEDITEFS
    ADVANCE AIRBILL
DZ/,SI/
N1/
N2/
DC/,DT/,DN/
    ADVANCE AIRBILL
PU/
PC/,PT/,PN/
PICKUP/TENDER- 14FEB 5.43A
READY/DELIVERY- 14FEB 3.59P -continued Booking Entry Table I ATTN. DFW CARGO OPEN 24 HRS    14FEB FRIDAY
ATTN. BDL HRS ARE 0600-2300 14FEB FRIDAY
To accept the flight itinerary and create a booking record:
TABLE ENTRY 8

ET (enter)                        ET =        End Transaction

Once the shipment is successfully booked and received, the instant invention loads, links or otherwise passes control to an automated baggage tracking system typically associated with passenger service processing. One example of such a system would be the American Airlines PSS (a.k.a. Passenger Service System) synonymously referred to as SABRE®. The PSS system, another baggage system or manual indication then associates the shipment's cargo tracking number which is typically referred to as an air waybill number, with a baggage identifier, and then prints or otherwise presents this information as well as a complete shipment routing sequence on a uniquely identifiable tag 15 containing: bar coded information indicative of an air waybill record; bar coded information indicative of a passenger service baggage tag record; total number of pieces associated with the shipment; total weight of the total pieces associated with the shipment; the average weight of each piece associated with the shipment; the shipment routing sequence and at least one uniquely identifiable transport accommodation. To provide for expedient and timely transfer between connecting transport accommodations, the baggage tag identifier (associated with the air waybill and shipment as presented on the unique tag of the invention) allows for transfers to take place in concert with passenger baggage and thus avoids necessity for processing the connecting shipment at a centralized receiving facility. The passenger service baggage tag record for purposes of convenience and easy identification is typically though not limitedly identified and presented in a plurality of locations with such presentation occurring in two immediately adjacent areas that are distinguishably oriented in a printing position 90° opposed from the other. Detailed discussion of the invention's novel tag will be presented in association with FIGS. 2-2D.

Having generated the multi-system tracking and shipping tag and attendant shipping documents 15, the process next requires the unique and novel tag of the instant invention to be associated with the shipment(s) to be shipped 18. Such association typically requires affixing or otherwise attaching the shipment tag of each shipment in the shipment. It is also known to "associate" commodities with shipment information in digitally encoded form whereby such information may be positioned within the internal portion of a shipment and communicated via scanning means. Other non-limiting though common means of associating shipment tags are well known to those skilled in the art and typically include pasting, loop attaching, wiring, stapling and other similarly intended attachment means. The shipment is then segregated according to destination city handling requirements 22 and then stowed upon the identified transport accommodation and is then transported between an origination and destination location 23. Once placed upon the transport accommodation, a status record is generated via manual entry or scanning means to reflect the present status and positioning of the customer's shipment 24. Handheld scanning and/or manual means to record shipment status entry through automated cargo tracking systems are well known to those skilled in the art, with statusing records stored upon a database and accessible to one or more automated retrieval systems well known and practiced by those skilled in the art.

Upon being transported between an origination and destination location 24, the shipment is then identified as having arrived at a destination city 27. At this juncture it must be determined if this destination is the shipment's final destination as indicated on the uniquely structured tag 30. If it is not the shipment's final destination as indicated on the tag, it is next determined if the shipment's next destination is an international destination 33. If the shipment's destination is not an international destination, the shipment is then segregated 34 and stowed via "tail-to-tail" aboard the next accommodation as indicated on the tag 35, and when stowed, the shipment's new position and location status is again recorded 24.

If, however, it is determined that the shipment next destination is an international destination 33, the shipment is segregated and transported to a centralized receiving facility and any required international shipment formalities are completed 66. Once completed, the shipment is then stowed aboard the next transport accommodation 36 as indicated on tag. In the instance where the shipment's destination at an arrival city is the shipment's final destination as indicated on the unique tag, the shipment is then transported to a centralized handling processing/receiving facility 51 where it is next determined if a secondary means of transport is required 54. If a secondary means of transport is required the shipment is then stowed upon the secondary transport means 60 and the shipment is transported to the customer 63 whereupon the customer is notified of the shipment's arrival 57. In the instance where a secondary transport means is not required 54 at a shipments indicated final destination, the customer or a third party is notified of the shipments arrival 57.

Consequently it can be seen according to FIG. 1, at least three potential arrival/destination scenarios may be encountered and addressed by the instant invention:

A. The circumstance where the shipment's arrival in a destination/location is the shipment's final destination and thereafter the shipment is transported to a cargo or centralized receiving facility for customer pickup/notification.

B. The circumstance where the shipment's arrival in a destination is not its final destination.

The shipment is then stowed aboard a subsequent transport accommodation consistent with routing information displayed upon the shipment tag. Then tracking and recording of continuing shipment of the shipment between subsequent uniquely identifiable and geographically desperate origination and destination locations occurs in an iterative manner until the shipment's arrival in a destination location is determined to be the shipment's final destination. The shipment is thereafter transported to a cargo processing facility for customer notification/pickup.

C. The circumstance where a shipment's arrival in a destination location is not the shipment's final destination and the shipment's continuing transport requires the processing of international transport documents. Then the shipment is transported to a cargo processing or centralized receiving facility for international gateway shipment formality completion and then stowed aboard a subsequent transport accommodation consistent with continuing shipment routing information displayed upon the shipment tag. Then tracking and recording the continued transport of the shipment as it is transported between subsequent uniquely identifiable and geographically disparate origination and destination locations occurs in an iterative manner until the shipment's arrival in a destination location is determined to be the shipment's final destination and thereafter transporting the shipment to a cargo processing or centralized handling facility.

Figure 2:
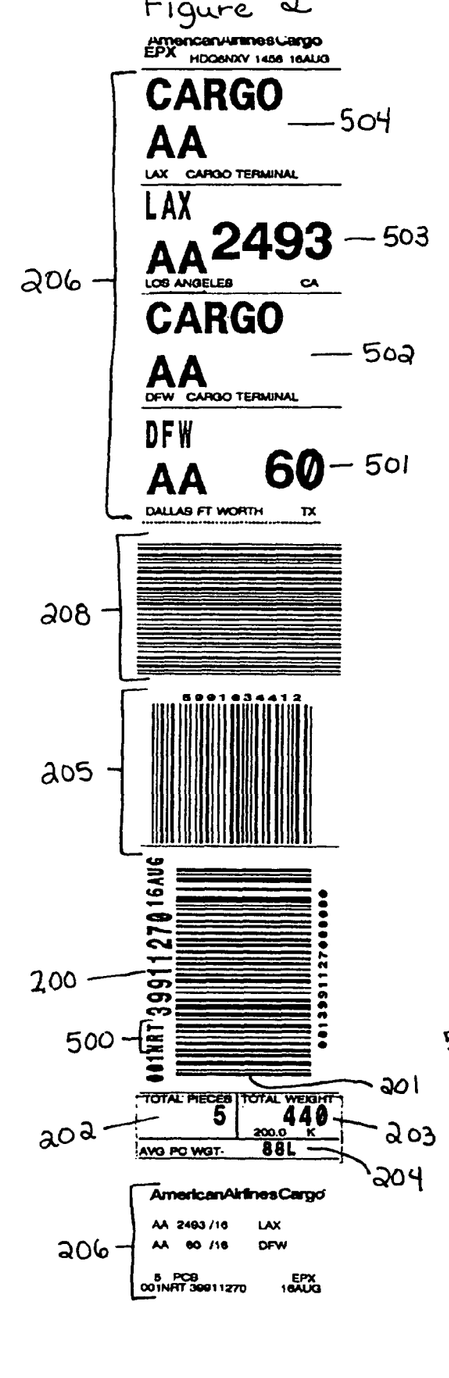
FIGS. 2 through 2D illustrate the novel and unique shipment tag of the instant invention as utilized in conjunction with the process steps of FIG. 1.
Figure 2A:
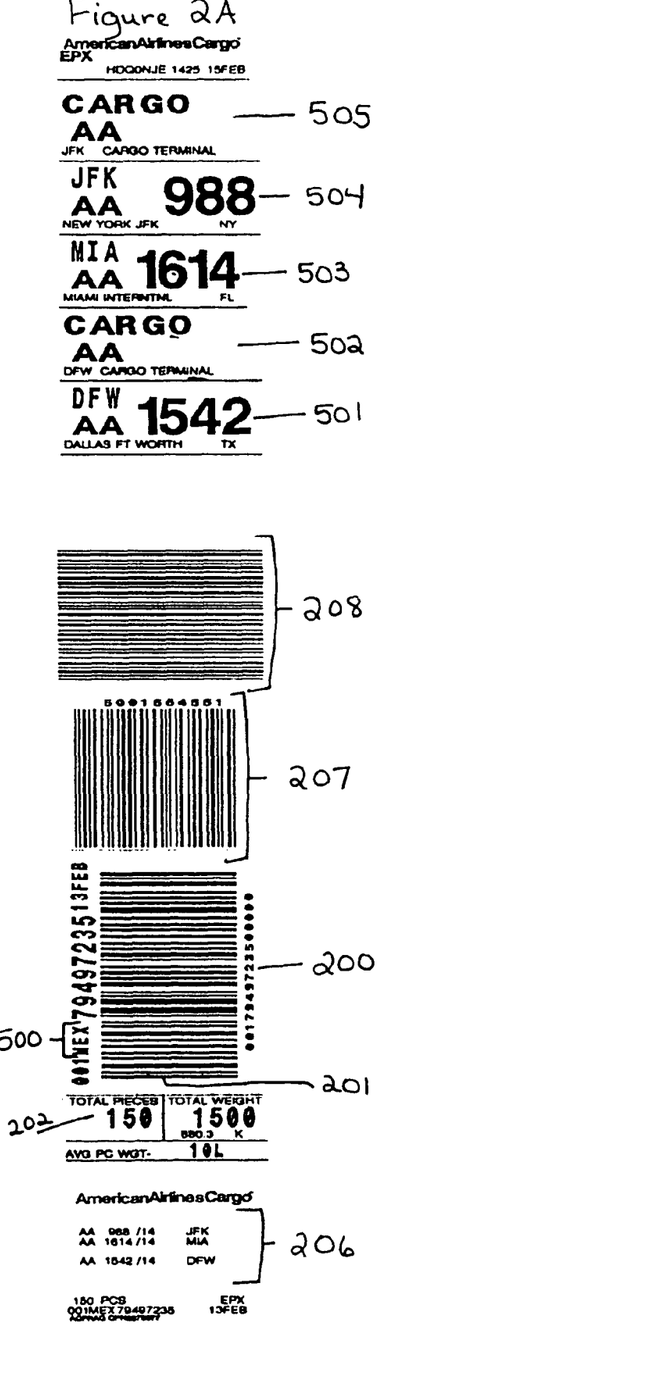
Figure 2B:
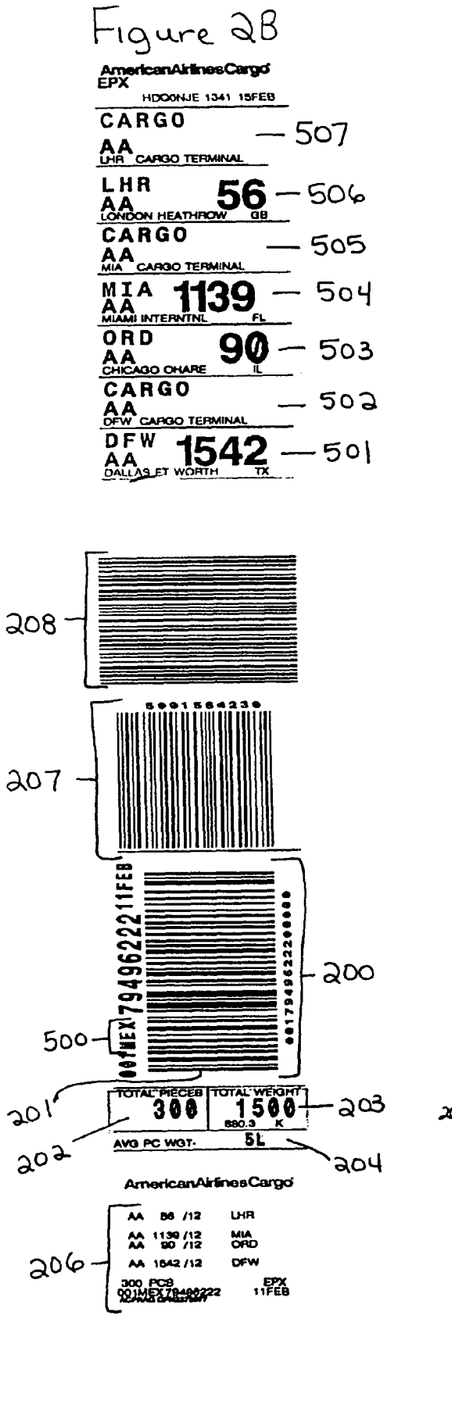
Figure 2C:
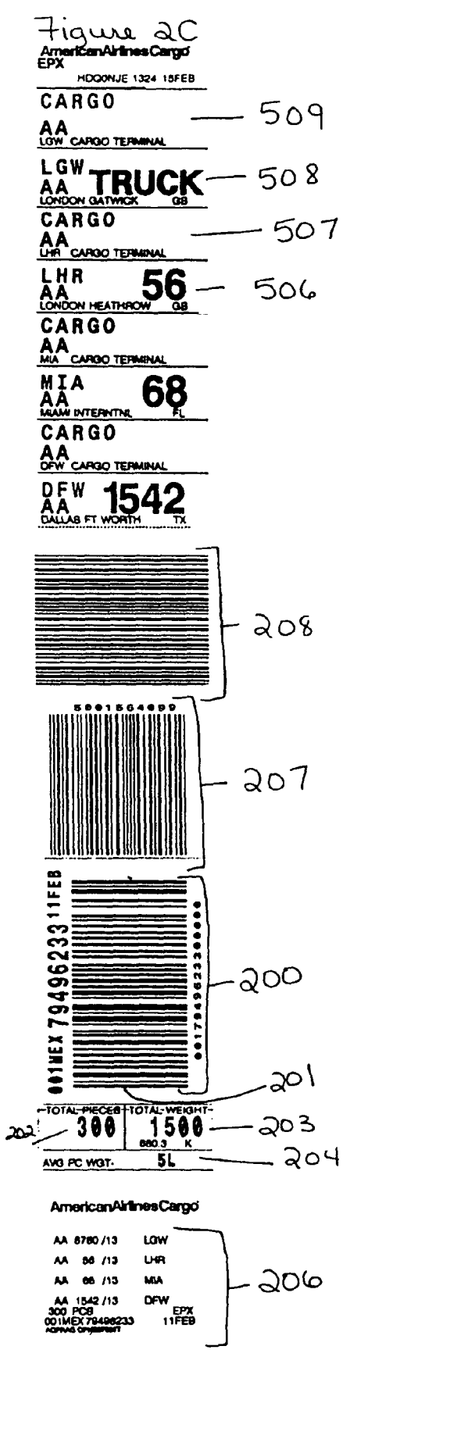
Figure 2D:
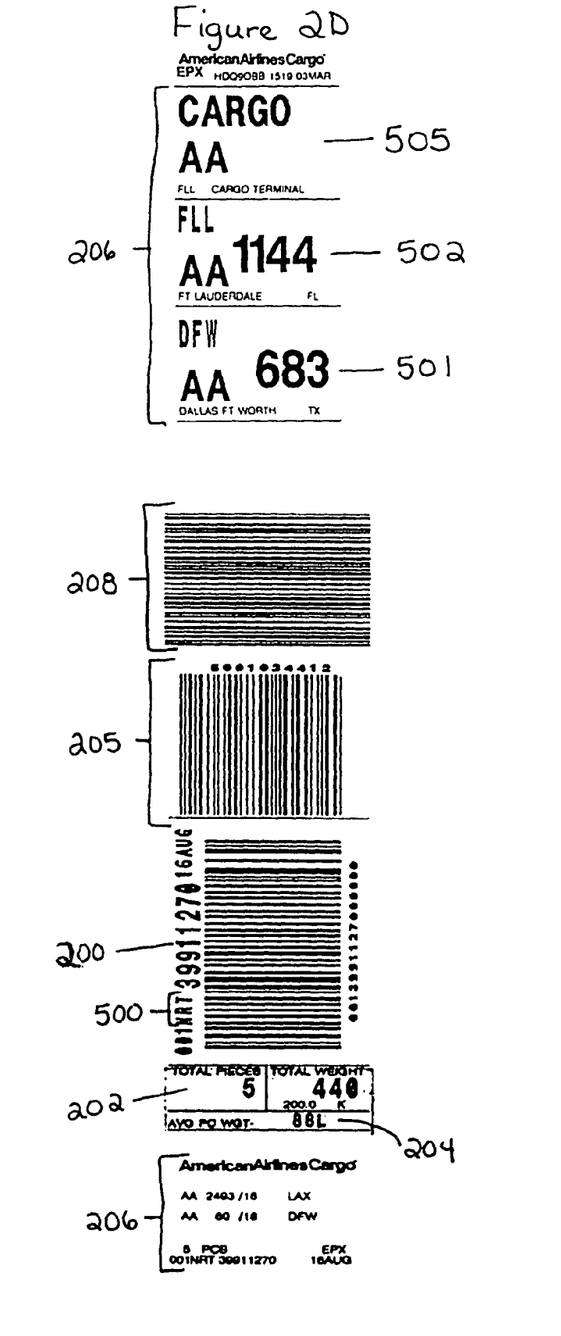

FIGS. 2 through 2D illustrate the novel and unique shipment tag of the instant invention as utilized in conjunction with the process steps of FIG. 1 and utilized in various routing sequences between a shipment's origination and ultimate destination cities. Turning now to FIGS. 2 through 2D.

Consistent with the processing steps illustrated and discussed in association with FIG. 1, various presentations of routing sequences may be provided on the unique and novel shipment tag of the instant invention. In FIG. 2 it is shown where an air waybill, or bill of lading identifier has been presented in both recognizable 200 and bar coded formats 201. The total number of pieces in the shipment's shipment is shown as 202. Total weight is reflected as element 203. Average weight of the total pieces of the shipment's shipment is shown as 204. An uniquely identifiable transport accommodation routing information is shown in element 206. Also illustrated in FIG. 2 is the baggage tag information presented in locations 207 and 208. For purposes of full and enabling disclosure the unique tag illustrated in FIG. 2 shows an accommodation routing aboard American Airlines Flight 60 from Narita Japan (NRT) 500 to Dallas Fort Worth (DFW) 501. Upon arrival at American Airlines DFW station, the shipment is then indicated for transport to the American Airlines cargo terminal 502 as it has been received from an international city 500. Once having been processed at customs the shipment is then shuttled to American Airlines Flight 2493 503 for shipment to Los Angeles (LAX) whereupon arrival of the shipment is then taken to the LAX cargo terminal 224 for pick up by the customer following U.S. Custom's clearance.

The tag as illustrated in FIG. 2A is fundamentally consistent with the discussion associated with FIG. 2, a shipment routing from Mexico City (MEX) 500 to Dallas Fort Worth (DFW) 501 aboard American Airlines Flight 1542 whereupon it is taken to a cargo area 502 for international customs processing purposes and is then routed aboard American Airlines Flight 1614 503 from Dallas Fort Worth to Miami (MIA). In Miami, the shipment is interrogated and then it is determined that Miami is not the shipment's final destination. The shipment is then (tail-to-tail) transfer next to be placed aboard American Airlines Flight 988 504 from Miami to New York City (JFK). Upon arrival in JFK, it is next determined that the shipment should be routed to the American Airlines cargo or centralized receiving facility for customer notification and pick up 505. Note is particularly drawn with respect to FIG. 2A to the international processing and then "tail-to-tail transfers" between American Airlines Flights 1614 503 and 988 504. The shipment is processed as passenger baggage and the shipment is immediately placed upon connecting Flight 988 absent the time delay associated with sending the shipment to a cargo processing facility for continuing connections.

Turning now to FIG. 2B for another routing sequence as identified on the unique processing tag of the instant invention wherein a Mexico City (MEX) 500, Dallas Fort Worth (DFW) 501, Cargo 522, Chicago (ORD) 503, Miami (MIA) 504, Cargo 505, London Heathrow (LHR) 506, London Heathrow cargo 507 routing is displayed. Of particular relevance in FIG. 2B is the shipment's arrival in Miami aboard American Airlines Flight 1139 504 where it is determined that the next destination in this shipments shipment is London Heathrow's airport aboard American Airlines Flight 56. To comply with international shipping requirements, it is seen where the shipment is designated for routing through the American Airlines Miami Cargo 505 facility to complete international shipment formalities prior to placement and subsequent transport aboard American Airlines Flight 56 originating in Miami with the shipment's final destination designated as London Heathrow airport 506.

FIG. 2C illustrates a shipment tag where upon arriving at London Heathrow airport (LHR) aboard American Airlines Flight 56 506, the shipment is then transported to London Heathrow airport's cargo terminal 507 for international arrival processing. During international processing it is determined that London Heathrow airport is not the shipments final destination. Rather, the final destination of the shipment of FIG. 2C is London Gatwick (LGW) airport 508. Accommodation and transport between London Heathrow and London Gatwick (LGW) is to be facilitated via truck 508. Following completion of international arrival formalities, the shipment is placed upon the truck as indicated in the invention's unique baggage tag and the shipment is then transported to London Gatwick's cargo terminal 509 for subsequent customer notification of arrival and pick up.

FIG. 2D illustrates a shipment tag wherein the instant inventions tail-to-tail transfer process is easily identified. In FIG. 2C the shipment is shown with a origination location in San Jose, Calif. (SJC) 500 and travels on American's flight 683 to Dallas Fort Worth (DFW) 501. Upon arriving in Dallas Fort Worth 501, the novel multi-system tag of the instant invention next shows the shipment is to be transported from Dallas Fort Worth 501 to Fort Lauderdale, Fla. (FLL) 502 aboard American Airlines Flight 1144. Consequently, upon arrival in Dallas Fort Worth 501, the shipment is unloaded with other shipments and passenger baggage and then segregated for tail-to-tail transfer to the connecting flight 1144 absent need to first bring the shipment to a centralizing handling facility as is contemplated and practiced in contemporary art systems. Once having traveled from Dallas Fort Worth 501 to Fort Lauderdale, Fla. 502 aboard American Airlines flight 1144, the shipment is next indicated to be transferred to the American Airlines cargo terminal 505 (herein synonymously referred to as centralized handling facility) whereupon the customer will be notified for shipment pickup.

It will be apparent to those skilled in the art that various modifications and variations can be made in the construction, configuration, and/or operation of the present invention without departing from the scope or spirit of the invention. For example, in the embodiments mentioned above, variations in the materials used to make each element of the invention may vary without departing from the scope of the invention. Thus, it is intended that the present invention cover the modifications and variations of the invention provided they come within the scope of the appended claims and their equivalents.

While this invention has been described to illustrative embodiments, this description is not to be construed in a limiting sense. Various modifications and combinations of the illustrative embodiments as well as other embodiments will be apparent to those skilled in the art upon referencing this disclosure. It is therefore intended that this disclosure encompass any such modifications or embodiments.

What is claimed is:

1. A method for facilitating the transport of shipments according to a scheduled and uniquely identifiable transport accommodation said method comprising the steps of:
   (a) acknowledging a customer request to transport at least one shipment between two uniquely identifiable and geographically disparate origination and destination locations;

(b) determining a routing sequence and at least one scheduled and uniquely identifiable transport accommodation satisfying said customer request;
(c) booking shipment transport space aboard said determined transport accommodation;
(d) generating a shipment tag which includes shipment routing information and bar coded information;
(e) attaching or otherwise affixing the shipment tag generated in step (d) to a shipment to be shipped according to the routing sequence and transport accommodation determined in step (b);
(f) stowing the shipment of step (e) aboard a first transport accommodation consistent with shipment routing information generated in step (d);
(g) monitoring and recording the transport of the shipment stowed in step (f) as it is transported between uniquely identifiable and geographically disparate origination and destination locations; and
(h) advising a customer of a shipment's arrival in a final destination location; wherein determining a routing sequence and at least one scheduled and uniquely identifiable transport accommodation further comprises:
determining a routing sequence and at least one scheduled and uniquely identifiable transport accommodation satisfying said customer request by accessing a computer resident cargo transport system;
providing shipment parameters to said system selected from a list including shipment weight limits, shipment size, commodity code, accommodation connect time standards, shipping and receiving rate location hours of operation; and
retrieving a routing sequence and transport accommodation from said system based upon optimal space and weight capacity yielded as a result of automated consideration of said shipment parameters.

2. The method of claim 1 wherein said shipments are cargo shipments and said uniquely identifiable transport accommodation is an aircraft.

3. The method of claim 1 wherein said shipments are cargo shipments and said uniquely identifiable transport accommodation is either an aircraft or a transport vehicle limited to land based operations.

4. The method of claim 1 wherein said shipments are cargo shipments and said uniquely identifiable transport accommodation is either an aircraft or a transport vehicle limited to water based operations.

5. The method of claim 1 wherein booking shipment transport space aboard said determined transport accommodation further comprises generating a computer recognizable booking entry and communicating said entry to software purposed for cargo shipment tracking.

6. The method of claim 1 wherein said generated tag including shipment routing information and bar coded information is generated via software purposed for addressing passenger service requirements.

7. The method of claim 1 wherein stowing the shipment of step (e) aboard a first transport accommodation consistent with shipment routing information generated in step (d) further comprises segregating said shipment according to the next destination city's handling requirements prior to said stowing.

8. The method of claim 1 wherein monitoring and recording the transport of shipment stowed in step (f) further comprises determining said shipment's arrival in a destination location is the shipment's final destination and thereafter transporting the shipment to a centralized handling/processing facility.

9. The method of claim 1 wherein tracking and recording the transport of the shipment stowed in step (f) further comprises determining said shipment's arrival in a destination location is not the final destination of said shipment's transport and then stowing the shipment tagged in step (e) aboard a subsequent transport accommodation consistent with continuing shipment routing information displayed upon the shipment tag generated in step (d);
tracking and recording the continuing transport of said shipment as it is transported between subsequent uniquely identifiable and geographically disparate origination and termination locations in an iterative manners until said shipment's arrival in a destination location is determined to be said shipment's final destination and thereafter transporting the shipment to a cargo processing facility.

10. The method of claim 1 wherein acknowledging a customer request to transport at least one cargo shipment between two uniquely identifiable and geographically disparate locations further comprises determining said shipment's arrival in a destination location is not the final destination of said shipment's transport;
transporting the shipment to a centralized handling/processing facility for international gateway shipment and then stowing the shipment tagged in step (e) aboard a subsequent transport accommodation consistent with continuing shipment routing information displayed upon the shipment tag generated in step (d);
tracking and recording the continuing transport of said shipment as it is transported between subsequent uniquely identifiable and geographically disparate origination and termination locations in an iterative manner until said shipment's arrival in a destination location is determined to be said shipment's final destination and thereafter transporting the shipment to a final destination centralized handling/processing facility.

11. A shipment tag having shipment routing information and bar coded information in accordance with the method of claim 1.

12. A method for facilitating the transport of shipments according to a scheduled and uniquely identifiable flight sequence and air transport accommodation said method comprising the steps of:
(a) acknowledging a customer request to transport at least one shipment between two uniquely identifiable and geographically disparate origination and destination locations;
(b) determining a routing sequence and at least one scheduled and uniquely identifiable transport accommodation satisfying said customer request by accessing a computer resident cargo tracking system and then providing shipment parameters to said system selected from a list including shipment weight limits, shipment size, commodity code, accommodation connect time standards, shipping and receiving rate location hours of operation; retrieving a routing sequence and transport accommodation from said system based upon optimal space and weight capacity yielded as a result of automated consideration of said shipment parameters;
(c) booking shipment transport space aboard said determined transport accommodation;
(d) generating a shipment tag which includes shipment routing information and bar coded information from within a software system purposed for addressing passenger service requirements;

(e) attaching or otherwise affixing the shipment tag generated in step (d) to a shipment to be shipped according to the routing sequence and transport accommodation determined in step (b);

(f) stowing the shipment of step (e) aboard a first transport accommodation consistent with shipment routing information generated in step (d);

(g) monitoring and recording the transport of the shipment stowed in step (f) as it is transported between uniquely identifiable and geographically disparate origination and destination locations; and (h) advising a customer of a shipment's arrival in a final destination location.

13. The method of claim 12 wherein stowing the shipment of step (e) aboard a first transport accommodation consistent with shipment routing information generated in step (d) further comprises segregating said shipment according to the next destination city's handling requirements prior to said stowing.

14. The method of claim 12 wherein monitoring and recording the transport of shipment stowed in step (f) further comprises determining said shipment's arrival in a destination location is the shipment's final destination and thereafter transporting the shipment to a centralized handling/processing facility.

15. The method of claim 12 wherein tracking and recording the transport of the shipment stowed in step (f) further comprises determining said shipment's arrival in a destination location is not the final destination of said shipment's transport and then stowing the shipment tagged in step (e) aboard a subsequent transport accommodation consistent with continuing shipment routing information displayed upon the shipment tag generated in step (d);

tracking and recording the continuing transport of said shipment as it is transported between subsequent uniquely identifiable and geographically disparate origination and termination locations in an iterative manners until said shipment's arrival in a destination location is determined to be said shipment's final destination and thereafter transporting the shipment to a centralized handling/processing facility.

* * * * *